United States Patent
Ho et al.

(10) Patent No.: US 6,716,692 B1
(45) Date of Patent: Apr. 6, 2004

(54) FABRICATION PROCESS AND STRUCTURE OF LAMINATED CAPACITOR

(75) Inventors: Kwun-Yo Ho, Taipei Hsien (TW); Moriss Kung, Taipei Hsien (TW)

(73) Assignee: Via Technologies, Inc., Taipei Hsien (TW)

( * ) Notice: Subject to any disclaimer, the term of this patent is extended or adjusted under 35 U.S.C. 154(b) by 0 days.

(21) Appl. No.: 10/249,925

(22) Filed: May 20, 2003

(51) Int. Cl.$^7$ .................. H01L 21/8242; H01G 4/06
(52) U.S. Cl. ............... 438/238; 438/250; 438/253; 438/396; 438/393; 438/122; 361/321.2; 361/321.3; 361/321.4
(58) Field of Search .................. 438/122, 238, 438/250, 253, 393, 396; 257/703, 777; 361/321.2, 321.3, 321.4; 501/137, 138, 139

(56) References Cited

U.S. PATENT DOCUMENTS

| | | | | |
|---|---|---|---|---|
| 4,687,540 A | * | 8/1987 | Singhdeo et al. | 216/6 |
| 4,752,858 A | * | 6/1988 | Yokotani et al. | 361/321.4 |
| 4,875,136 A | * | 10/1989 | Sano et al. | 361/321.3 |
| 4,877,555 A | * | 10/1989 | Yuhaku et al. | 252/512 |
| 5,069,746 A | * | 12/1991 | Kimura et al. | 216/6 |
| 5,072,329 A | * | 12/1991 | Galvagni | 361/321.2 |
| 5,107,394 A | * | 4/1992 | Naito et al. | 361/309 |
| 5,615,078 A | * | 3/1997 | Hudis et al. | 361/313 |
| 5,663,089 A | * | 9/1997 | Tomozawa et al. | 427/576 |
| 6,125,027 A | * | 9/2000 | Klee et al. | 361/320 |
| 6,207,499 B1 | * | 3/2001 | Hoshi | 438/256 |
| 6,245,433 B1 | * | 6/2001 | Nakamura et al. | 428/469 |
| 6,380,619 B2 | * | 4/2002 | Ahiko et al. | 257/703 |

FOREIGN PATENT DOCUMENTS

| | | | | |
|---|---|---|---|---|
| JP | 62040841 A | * | 2/1987 | H04L/7/08 |
| JP | 2002231582 A | * | 8/2002 | H01G/9/042 |

* cited by examiner

*Primary Examiner*—John Niebling
*Assistant Examiner*—Jennifer M. Kennedy
(74) *Attorney, Agent, or Firm*—Jiang Chyun IP Office

(57) ABSTRACT

A fabrication process and a structure of a laminated capacitor. A substrate is provided, and multiple electrode and dielectric layers, formed using high-speed physical metal deposition and dielectric material coating, respectively, are alternately stacked to form a laminated capacitor structure. In addition, a pair of terminal electrodes is formed on two sides of the electrode layers. The terminal electrodes are electrically connected to the electrode layers. A surface metallic layer is formed on the exposed surface of the terminal electrodes to prevent the surface from being oxidized. Thereby, the adhesion between the electrode layers and the dielectric layers is improved. The thickness uniformity ratio of the dielectric layers can be maintained at about ∈±10%. The relative displacement between two neighboring electrode layers can be smaller than about 100 microns to approach the standard capacitance required by the laminated capacitor.

16 Claims, 6 Drawing Sheets

US 6,716,692 B1

FABRICATION PROCESS AND STRUCTURE OF LAMINATED CAPACITOR

CROSS REFERENCE TO RELATED APPLICATIONS

This application claims the priority benefit of Taiwan application serial no. 91136482, filed on Dec. 18, 2002.

BACKGROUND OF INVENTION

1. Field of the Invention

The invention relates in general to a fabrication process and a structure of a laminated capacitor, and more particularly, to a fabrication process which uses high-speed physical metal deposition and dielectric material coating to form multiple electrode layers and dielectric layers, respectively, alternately stacked to form a laminated capacitor structure.

2. Related Art of the Invention

With the advancement of semiconductor techniques, more sophisticated and advanced electronic devices have been developed based on the enhanced market demand of semiconductor assembly products. For example, the technique of flip-chip assembly, the design of laminated substrates and passive devices play important roles in semiconductor industry. In the example of flip-chip/ball grid array package structures, the chip is arranged on a surface of a package substrate and electrically connected thereto. The package substrate is typically integrated with multiple patterned wiring layers and multiple insulation layers. The patterned wiring layers can be formed through photolithography and etching steps, and the insulation layers are formed between two neighboring patterned wiring layers. In addition, to obtain better electrical performance, passive devices such as capacitors, inductors and resistors are formed on the package substrate and electrically connected to the chip and other electronic devices via an internal wiring of the package substrate.

In a high-speed operation of the chip, heat is generated from the passive devices. The heat generated from the chip is delivered to the package substrate and the passive devices. To allow the passive devices to operate normally without affecting the electric characteristics thereof even under a high-temperature environment, high-temperature endurable and highly stable passive devices have to be designed. The laminated ceramic capacitor is one such passive device.

The conventional laminated capacitor is typically constructed by stacking a plurality of dielectric layers and metallic layers. The ceramic dielectric layers are normally formed of materials with high dielectric constant such as barium titanate, while the metallic layers are typically made of conductive materials such as silver and silver-protactinium alloy. The metallic layers form a plurality of alternate positive and negative internal electrodes. A capacitor structure is thus formed with the internal electrodes and the ceramic dielectric layers. A pair of terminal electrodes is further formed at two sides of the metallic layers to electrically connect the positive and negative internal electrodes, respectively. A surface metal layer such as a nickel layer is formed on the surface of each terminal electrode to prevent oxidizing the terminal electrodes.

In addition, the process of the conventional laminated capacitor further comprises the following steps. A process of ceramic green tape is performed. In this process, dielectric powder such as barium titanate is uniformly mixed with organic binder to form a ceramic green tape. A metal paste printing process that uses screen printing to transfer metal powder and organic binder on the ceramic green tape to form a metal layer is performed. The processes of stacking and pressing are then performed on the ceramic green tape to form a structure laminated with multiple ceramic dielectric layers and metallic layers. The laminated structure is then disposed in a sinter temperature between 1100° C. and 1500° C. to perform sinter. A pair of terminal electrodes is then formed at two sides of the structure with ceramic dielectric layers and metallic layers that have been sintered. A sinter process is further performed to cure the terminal electrodes to complete the process of fabricating the laminated capacitor.

In the above sinter process, the organic solvent is evaporated during high-temperature sintering, such that the volume of the ceramic dielectric layers and the metallic layers are shrunk, affecting the junction connectivity thereof. Further, the thickness of the ceramic dielectric layers and the metallic layers cannot be consistent with each other, such that the capacitance cannot be controlled within the standard. In addition, in the sinter process, the thermal expansion coefficient of the metallic layers is different from that of the ceramic dielectric layers, and the optimum sintering temperature of the metallic layers is different from that of the ceramic dielectric layers, cracks, voids, seams, peels and delaminates may occur in the laminated capacitor to seriously affect the standard capacitance thereof.

SUMMARY OF INVENTION

The present invention provides a fabrication process and a method of a laminated capacitor. The laminated capacitor is formed under a constant temperature, such that the thickness of the dielectric layers and the adhesion layers are uniform. Further, the connectivity between the dielectric layers and the metallic layers is improved, and the capacitance of the laminated capacitor is controlled within the standard range.

The fabrication process of a laminated capacitor provided by the present invention comprises the following steps. A substrate is provided. A first masking layer is formed on the surface of the substrate. A step of high-speed physical deposition is performed to form a first electrode layer on the substrate surface exposed by the first masking layer. The first masking layer is removed. A first dielectric layer is formed on the first dielectric layer and the first electrode layer using dielectric material coating. A patterned second masking layer is formed on the first dielectric layer. A step of high-speed metal deposition is performed to form a second electrode layer on the first electrode layer exposed by the second masking layer. Thereby, the second electrode layer and the first electrode layer are at least partially overlapped with each other. The second masking layer is then removed.

According to the fabrication process provided by the present invention, two electrode layers may be formed. By repeating the steps for forming the patterned first masking layer to the step for removing the first masking layer once, three electrode layers are formed. By performing the step for forming the patterned first masking layer to the step of removing the second masking layer at least once, an even number (2N) of electrode layers is formed. After an even number of electrode layers is formed, by performing the step for forming the patterned first masking layer to the step of removing the first masking layer once again, an odd number of electrode layers (2N+1) is formed.

The above fabrication process further comprises the following steps. A second dielectric layer is formed on the second electrode layer and a topmost dielectric layer of the first dielectric layers. A pair of terminal electrodes is formed on two sides of the first electrode layers and the second electrode layers to electrically connect the first and second electrodes, respectively. A surface metal layer is formed on the exposed surface of the terminal electrodes.

The present invention further comprises a laminated capacitor comprising a plurality of electrode layers and at least one dielectric layer. Any two neighboring electrode layers are partially overlapped with each other, and the relative horizontal displacement between any neighboring two of the electrode layers is smaller than 100 microns. In addition, dielectric layers can be formed between any two neighboring dielectric layers with a thickness uniformity maintained at about $\in \pm 10\%$.

BRIEF DESCRIPTION OF DRAWINGS

These, as well as other features of the present invention, will become more apparent upon reference to the drawings.

DETAILED DESCRIPTION

First Embodiment

FIGS. 1A to 1H are cross-sectional views showing the fabrication process of a laminated capacitor according to a first embodiment of the present invention.

Figure 1A:
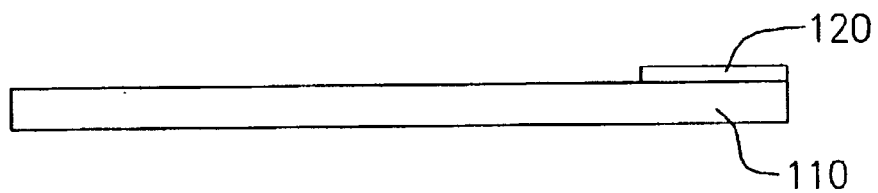
FIGS. 1A to 1H are cross-sectional views showing the fabrication process of a laminated capacitor according to a first embodiment of the present invention.
Figure 1B:
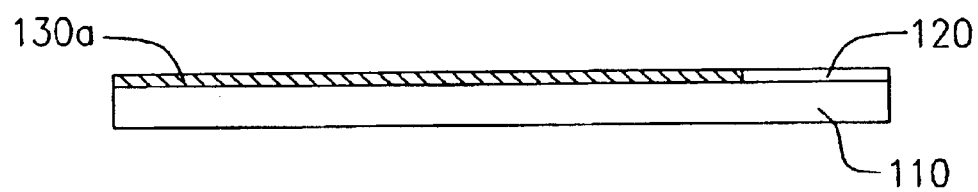
Figure 1C:
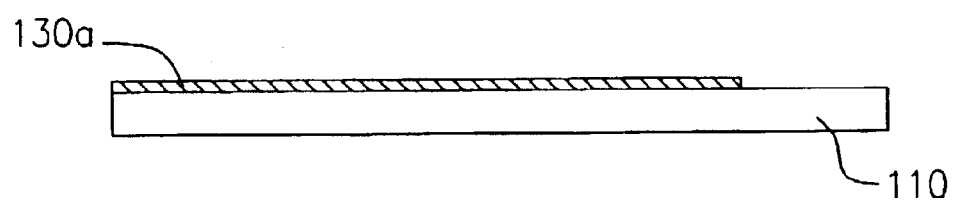

Referring to FIG. 1A, a substrate 110 is provided. The material of the substrate 110 includes a dielectric material, for example. A patterned first masking layer 120 is formed on the substrate 110 by using thin-film attachment or spin coating. Referring to FIG. 1B, a first electrode layer 130a is formed on the substrate 110 exposed by the first masking layer 120 by using high-speed physical metal deposition. The high-speed physical metal deposition includes metal deposition technologies such as metal spray or high-speed particle consolidation, for example. The metal spray further includes arc spray, plasma spray, flame spray, high velocity oxygen fuel spray, and cathode arc ion plating, for example. The first masking layer 120 is then removed to result in the structure as shown in FIG. 1C.

Figure 1D:
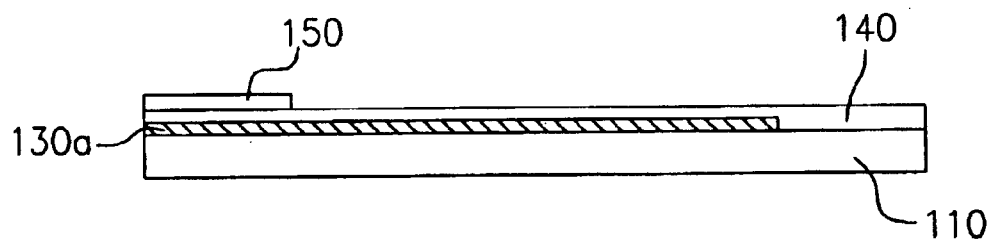
Figure 1E:
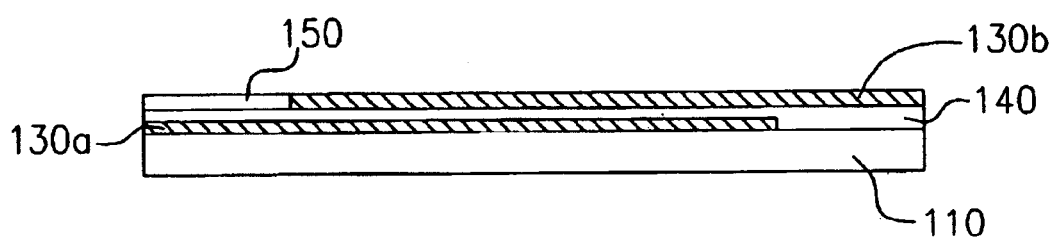
Figure 1F:
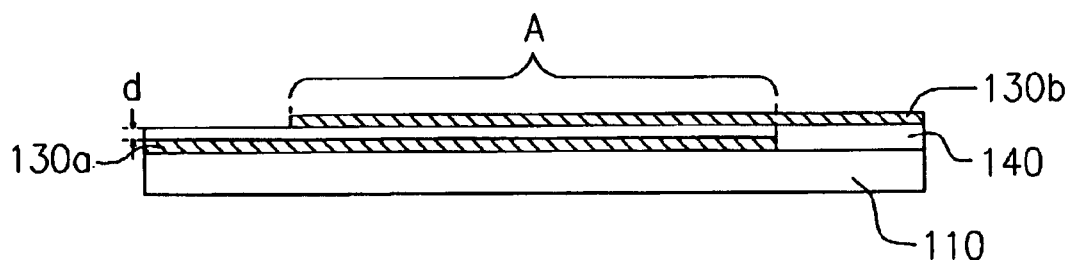

Referring to FIG. 1D, a first dielectric layer 140 is formed on the first electrode layer 130a and the substrate 110 using dielectric material coating. A patterned second masking layer 150 is formed on the dielectric layer 140. The second and first masking layers 150 and 120 are formed on two different sides of the substrate 110, such that the regions exposed thereby are different. Referring to FIG. 1E, a second electrode layer 130b is formed on the dielectric layer 140 exposed by the second masking layer 150 by using high-speed physical metal deposition. The second electrode layer 130b partially overlaps the first electrode layer 130a. The overlapped area and the space between the first and second electrode layers 130a and 130b determines the capacitance thereof. The second masking layer 150 is removed to form the structure as shown in FIG. 1F. From the above process, when the overlapped area is A and the space is d, the capacitance of these two electrode layers 130a and 130b can be calculated by $C=C_k*A/d$, where $C_k$ is the capacitance coefficient. In the process provided by the present invention, the sintering process is not required. Therefore, the thickness of the dielectric layer is not altered, such that the thickness uniformity is maintained at about $\in \pm 10\%$, and the thickness is within 90% to 110% of the standard thickness (about 25 microns). In addition, the present invention uses high-speed physical deposition to form the first and second electrode layers 130a and 130b with constant area. The precision is better than the conventional screen-printing process. Therefore, a displacement of the overlapping position between the neighboring electrodes 130a and 130b is smaller than 100 microns. Therefore, the overlapped area A can be maintained at a standard value.

Figure 1G:
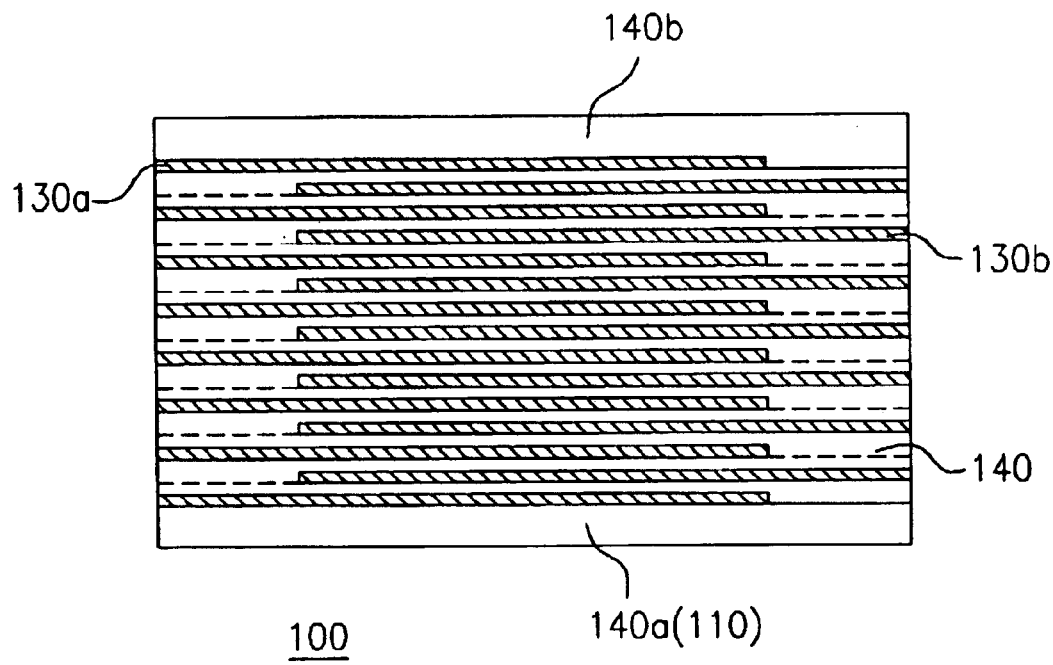

Referring to FIG. 1G, in addition to the step of providing the substrate 110, the above steps as shown in FIGS. 1A to 1F are repeated to obtain the laminated capacitor structure as shown in FIG. 1G, which comprises multiple first electrode layers 130a, multiple dielectric layers 140 and multiple second dielectric layers 130b. In the laminated capacitor structure, the first electrode layers 130a, the dielectric layers 140 and the second electrode layers 130b are sequentially laminated on the substrate 110. The number of the first and second electrode layers 130a and 130b can be even or odd. Thereby, the standard capacitance of the laminated capacitor 100 is determined according to the numbers of the first and second electrode layers 130a and 130b. In addition, covering layers 140a and 140b with specific thickness and hardness may be formed on a top surface and a bottom surface of the laminated capacitor 100 to protect the laminated capacitor 100 from being damaged by external force. The covering layer 140a is preferably constructed by the substrate 110, while the covering layer 140b is formed on the top of the laminated capacitor 100 by using dielectric material coating.

Figure 1H:
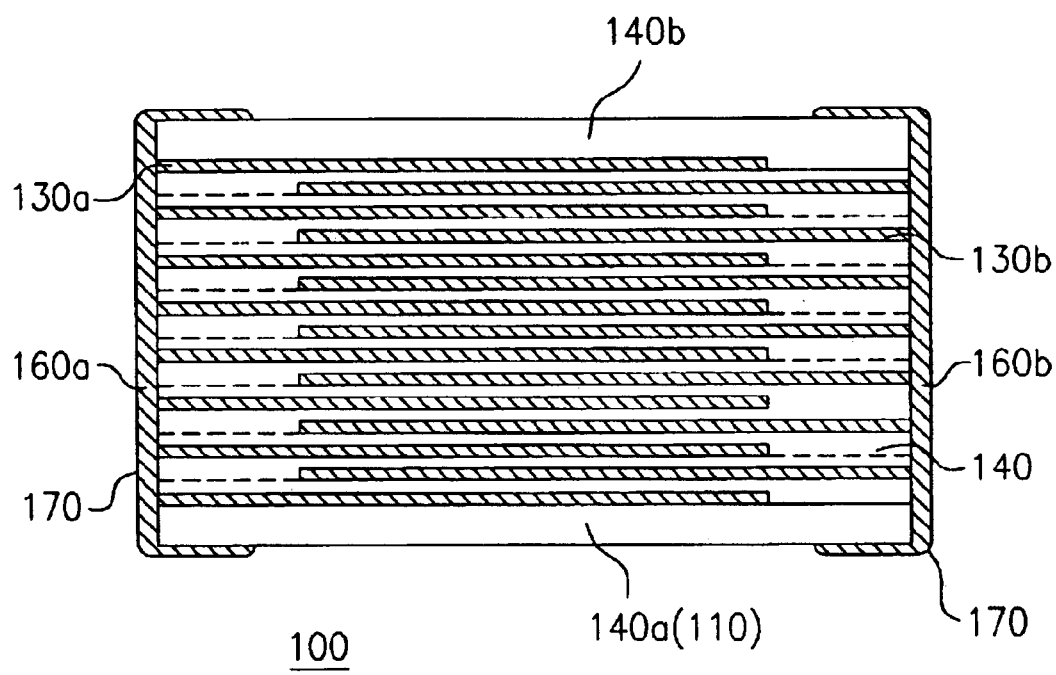

Referring to FIG. 1H, a pair of terminal electrodes 160a and 160b is formed on two sides of the laminated capacitor 100 with the terminal electrode 160a electrically connected to the first electrode layers 130a and the terminal electrode 160b electrically connected to the second electrode layers 130b. The method for forming the terminal electrodes 160a and 160b includes spray or coating metal layer. Optionally, a surface metal layer 170 may be formed on the exposed surfaces of the terminal electrodes 160a and 160b. The material of the surface metal layer 170 includes a composite layer or a single material layer of nickel/gold (Ni/Au) composite layer, solder layer or lead free solder layer, and the method for forming the surface metal layer 170 includes electroplating or dipping. As copper is easily-oxidized, when the terminal electrodes 160a and 160b are made of copper, the surface metal layer 170 prevents the terminal electrodes 160a and 160b from being oxidized.

Second Embodiment

FIGS. 2A to 2H are cross-sectional views showing the fabrication process of a laminated capacitor according to a second embodiment of the present invention.

Figure 2A:
FIGS. 2A to 2H are cross-sectional views showing the fabrication process of a laminated capacitor according to a second embodiment of the present invention.
Figure 2B:
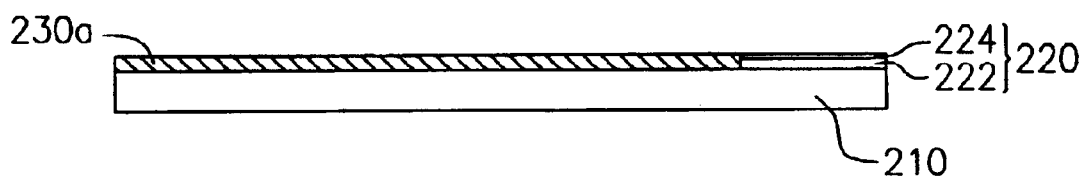
Figure 2C:
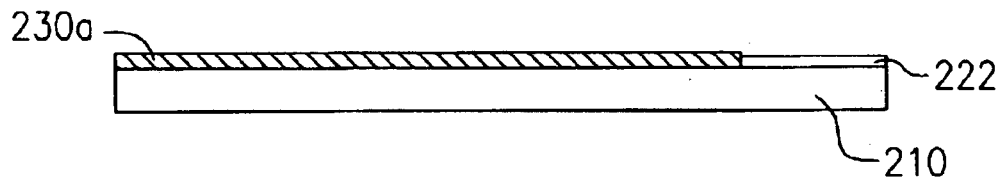

Referring to FIG. 2A, a substrate 210 is provided. The material of the substrate 210 includes a dielectric material, for example. A patterned first masking layer 220 is formed on the substrate 210. The first masking layer 220 includes a first masking dielectric layer 222 and a first removable thin film 224 sequentially stacked on the substrate 210. Referring to FIG. 2B, a first electrode layer 230a is globally formed on the substrate 210 exposed by the first masking layer 220 and on the first removable thin film 224 by using high-speed physical metal deposition. The detailed description the high-speed physical metal deposition has been introduced in the first embodiment and is not repeated again. The first removable thin film 224 is then removed, which consequently removes a portion of the first electrode layer 230a overlying the first removable layer 224, to result in the structure as shown in FIG. 2C.

Figure 2D:
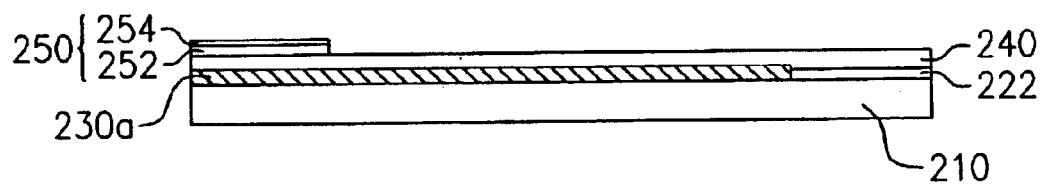
Figure 2E:
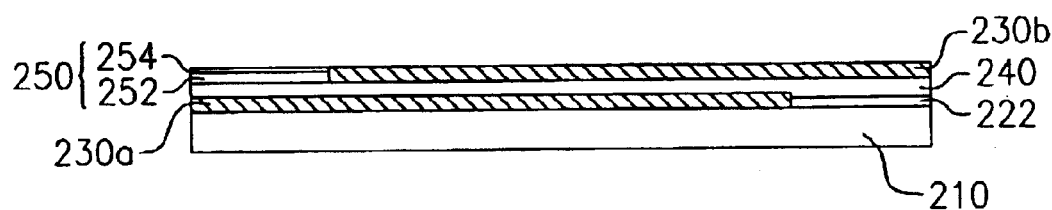
Figure 2F:
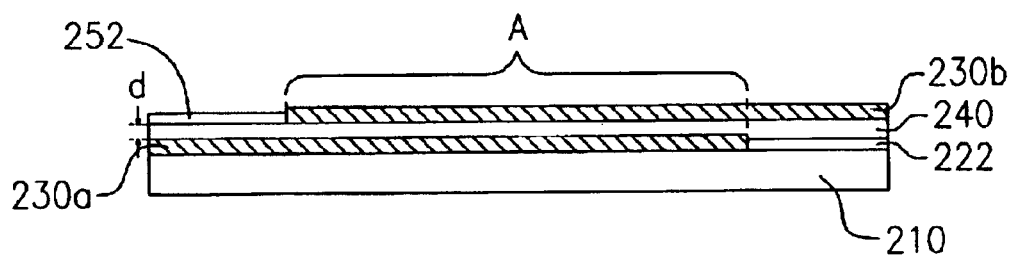

Referring to FIG. 2D, a first dielectric layer 240 is formed on the first electrode layer 230a and the first masking dielectric layer 222 by using dielectric material coating. A patterned second masking layer 250 is formed on the dielectric layer 240. The second masking layer 250 includes a second masking dielectric layer 252 and a second removable thin film 254 sequentially stacked on the dielectric layer 240. The second and first masking layers 250 and 220 are formed on two different sides of the substrate 210, such that the areas exposed thereby are different. Referring to FIG. 2E, a second electrode layer 130b is globally formed on the dielectric layer 240 exposed by the second masking layer 250 and on the second removable thin film 254 by using high-speed physical metal deposition. The second removable layer 254 is then removed, which consequently removes a portion of the second electrode layer 230b overlying the second removable layer 254, to result in the structure as shown in FIG. 2F. In the structure, the second electrode layer 230b and the first electrode layer 230a are partially overlapped.

Figure 2G:
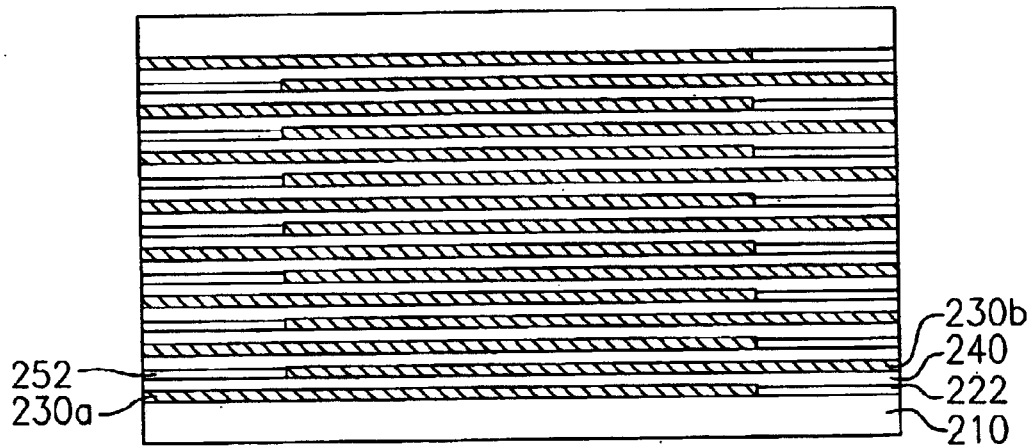
Figure 2H:
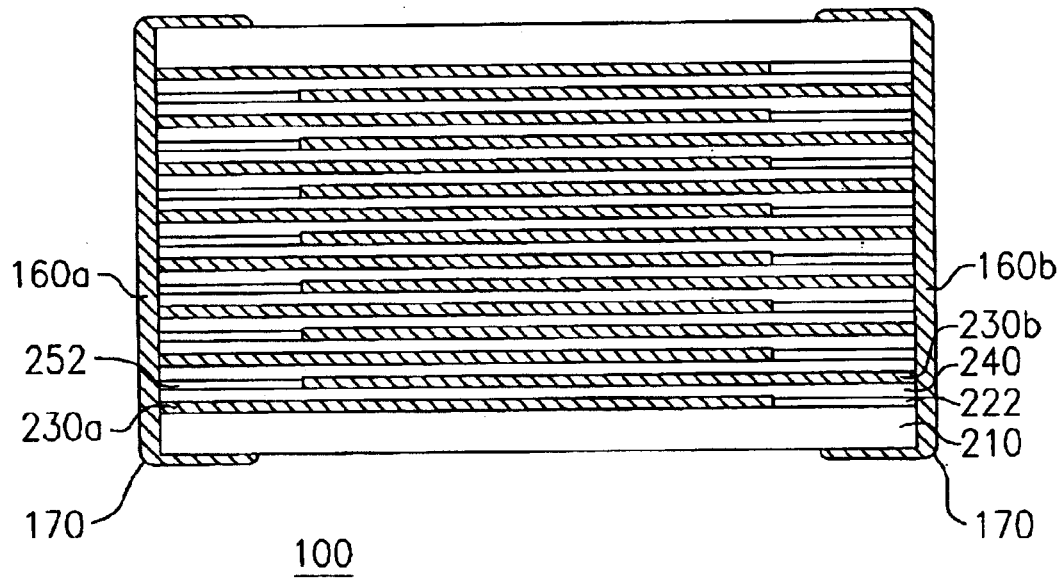

Similarly, the steps as shown in FIG. 2A to FIG. 2F are repeated at least once to form the laminated capacitor 200 as shown in FIG. 2G. In addition, a pair of terminal electrodes 260a and 260b is formed on two sides of the laminated capacitor 200 with the terminal electrode 260a electrically connected to the first electrode layers 130a and the terminal electrode 260b electrically connected to the second electrode layers 230b. The method for forming the terminal electrodes 260a and 260b includes spray or coating metal layer. Optionally, a surface metal layer 270 may be formed on the exposed surfaces of the terminal electrodes 260a and 260b. The resultant structure of the laminated capacitor 200 is shown as FIG. 2H.

From the above description, the fabrication process of laminated capacitor provided by the present invention differs from the conventional process and provides a breakthrough in application of semiconductors. Particularly, the conventional process for fabricating the laminated capacitor and the conventional process for the package substrate are performed separately. In the present invention, the surface of the package substrate is used as the substrate layer to perform the steps as shown in FIGS. 1A to 1G (or FIGS. 2A to 2G) thereon. After the laminated capacitor is fabricated, the post-process for package substrate is performed. Thereby, the laminated capacitor is not limited to being formed on the surface of the package substrate, but can also be embedded therein as an embedded passive device.

The metal layer coated by the high-speed metal deposition technique has a larger external radius, such that the time for the fabrication process is largely reduced. The adhesion between the electrode layers and the dielectric layers is improved to avoid formation of voids, or delamination, such that the capacitance of the laminated capacitor is controlled within the standard range.

According to the above, the present invention has at least the following advantages.

1. The fabrication process does not require the sinter step, such that the thickness of the dielectric layers will not be altered thereby.

As a result, the thickness uniformity is maintained at about ∈±10%. The area of the electrode layer using high-speed physical deposition is more precisely controlled than the conventional screen-printing technique. Therefore, the displacement for overlap position between two neighboring electrode layers is smaller than about 100 microns.

2. The surface of the package substrate can be used to form the first electrode layer, the dielectric layer and the second electrode layer thereon directly. Therefore, the post process for the package substrate can be performed after the laminated capacitor is formed.

3. The laminated capacitor is formed by alternately stacking electrode layers formed by using high-speed physical metal deposition and the dielectric layers formed by using dielectric material coating. As the metal layer coated by high-speed physical metal deposition has a larger external diameter, the time for the process is greatly reduced. The adhesion between the electrode layers and the dielectric layers is improved to avoid formation of voids and delamination. Therefore, the laminated capacitor provides a more stable capacitance.

Other embodiments of the invention will appear to those skilled in the art from consideration of the specification and practice of the invention disclosed herein. It is intended that the specification and examples be considered as exemplary only, with a true scope and spirit of the invention being indicated by the following claims.

What is claimed is:

1. A fabrication process of a laminated capacitor, comprising:
   (1) providing a substrate layer;
   (2) forming a patterned first masking layer on the substrate layer;
   (3) using high-speed physical metal deposition to form a first electrode layer on the substrate layer exposed by the first masking layer;
   (4) removing the first masking layer;
   (5) using dielectric material coating to form a first dielectric layer on the first electrode layer and the substrate layer;
   (6) forming a patterned second masking layer on the first dielectric layer;
   (7) using high-speed physical metal deposition to form a second electrode layer on the first dielectric layer exposed by the second masking layer
   (8) removing the second masking layer; and
   (9) forming a second dielectric layer over the second electrode layer and the first dielectric layer by coating.

2. The process according to claim 1, further comprising at least repeating one time of the steps of (2) to (5), wherein the first electrode layer and the second electrode layer have at least an overlapping region.

3. The process according to claim 1, further comprising at least repeating one time of the steps of (2) to (9), wherein the first electrode layer and the second electrode layer have at least an overlapping region.

4. The process according to claim 3, further comprising at least repeating one time of the steps of (2) to (5), wherein the first electrode layer and the second electrode layer have at least an overlapping region.

5. The process according to claim 1, further comprising a step (10) of forming a pair of terminal electrodes on both sides of the first electrode layer and the second electrode layer for electrical coupling, respectively.

6. The process according to claim 5, further comprising a step (11) of forming a surface metal layer on exposed surfaces of the terminal electrodes.

7. The process according to claim 6, wherein the surface metal layer is selected from one of the nickel/gold composite layer and solder layer.

8. The process according to claim 1, wherein the high-speed physical metal deposition is selected from one of high-speed particle consolidation, arc spray, plasma spray, flame spray, high velocity hydrogen fuel spray and cathode arc ion plating.

9. A fabrication process of a laminated capacitor, comprising:

(1) providing a substrate layer;

(2) forming a patterned first masking layer on the substrate layer, the first masking layer comprising a first masking dielectric layer and a first removable thin film sequentially stacked on the substrate layer;

(3) using high-speed physical metal deposition to globally form a first electrode layer on the substrate layer exposed by the first masking layer and the first removable thin film;

(4) removing the first removable thin film layer and consequently removing a part of the first electrode layer overlying the first removable thin film;

(5) using dielectric material coating to form a first dielectric layer on the first electrode layer and the first masking dielectric layer;

(6) forming a patterned second masking layer on the first dielectric layer, the second masking layer comprising a second masking dielectric layer and a second removable thin film sequentially stacked on the first dielectric layer;

(7) using high-speed physical metal deposition to globally form a second electrode layer on the first dielectric layer exposed by the second masking layer and the second removable thin film;

(8) removing the second removable thin film and consequently removing a part of the second electrode layer overlying the second removable thin film, wherein the remaining second electrode layer is at least partially overlapped with the first electrode layer; and (9) using dielectric material coating to form a second dielectric layer over the second electrode layer and the second masking dielectric layer.

10. The process according to claim 9, further comprising at least repeating one time of the steps of (2) to (5), wherein the first electrode layer and the second electrode layer have an overlapping region.

11. The process according to claim 9, further comprising at least repeating one time of the steps of (2) to (9), wherein the first electrode layer and the second electrode layer have an overlapping region.

12. The process according to claim 11, further comprising at least repeating one time of the steps of (2) to (5), wherein the first electrode layer and the second electrode layer have an overlapping region.

13. The process according to claim 9, further comprising a step (10) of forming a pair of terminal electrodes on both sides of the first electrode layer and the second electrode layer for electrical coupling, respectively.

14. The process according to claim 13, further comprising a step (11) of forming a surface metal layer on exposed surfaces of the terminal electrodes.

15. The process according to claim 14, wherein the surface metal layer is selected from one of nickel/gold composite layer and solder layer.

16. The process according to claim 9, wherein the high-speed physical metal deposition is selected from one of comprises high-speed article consolidation, arc spray, plasma spray, flame spray, high velocity hydrogen fuel spray and cathode arc ion plating.

* * * * *